(12) United States Patent
Mantei et al.

(10) Patent No.: US 11,892,892 B1
(45) Date of Patent: Feb. 6, 2024

(54) METHOD FOR MONITORING AND DETECTING THE ELECTRICAL TOPOLOGY OF A SUPPLY NETWORK

(71) Applicant: Turck Holding GmbH, Halver (DE)

(72) Inventors: Dirk Mantei, Detmold (DE); Friedrich Becker, Lemgo (DE)

(73) Assignee: Turck Holding Gmbh, Halver (DE)

( * ) Notice: Subject to any disclaimer, the term of this patent is extended or adjusted under 35 U.S.C. 154(b) by 0 days.

(21) Appl. No.: 18/461,173

(22) Filed: Sep. 5, 2023

(30) Foreign Application Priority Data

Sep. 6, 2022 (DE) ...................... 10 2022 122 617.4

(51) Int. Cl.
*G06F 1/3209* (2019.01)
*G06F 1/3206* (2019.01)
*G06F 1/26* (2006.01)
*G06F 1/3203* (2019.01)

(52) U.S. Cl.
CPC .............. *G06F 1/3209* (2013.01); *G06F 1/26* (2013.01); *G06F 1/3203* (2013.01); *G06F 1/3206* (2013.01)

(58) Field of Classification Search
CPC .... G06F 1/3209; G06F 1/3206; G06F 1/3203; G06F 1/26
USPC ........................................................ 713/323
See application file for complete search history.

(56) References Cited

U.S. PATENT DOCUMENTS

| 7,076,694 B2 | 7/2006 | Schuster | |
|---|---|---|---|
| 2004/0098514 A1* | 5/2004 | Schuster | ................. H04L 41/12 370/257 |
| 2013/0332001 A1* | 12/2013 | Parello | .................. G06F 1/3209 700/295 |

(Continued)

FOREIGN PATENT DOCUMENTS

| DE | 100 48 745 C1 | 2/2002 |
|---|---|---|
| DE | 10 2020 121 752 A1 | 2/2022 |
| EP | 2 748 907 B1 | 9/2015 |

OTHER PUBLICATIONS

Office Action by the German Patent and Trademark Office (GPTO) issued in DE 10 2022 122 617.4, to which this application claims priority, dated Apr. 13, 2023 (English-language machine translation attached).

(Continued)

*Primary Examiner* — Chun Cao
(74) *Attorney, Agent, or Firm* — Tautz & Schuhmacher LLC (57) ABSTRACT

A method detects the electrical topology of a supply network. The network includes at least one power supply unit, a control unit, at least one field bus device, and at least one measuring device. The field bus devices are supplied by the power supply unit. The measuring device is a smart connector, a field bus device, and/or an operating value sensor integrated in the power supply unit or connected thereto. A load is a field bus device and/or another device presenting a load. The method includes a) activating a load to generate an operating signal, b) receiving the operating signal and/or a (Continued)

time profile of the operating signal, c) detecting the operating value, d) evaluating the detection data from the operating signal, and e) applying an algorithm to determine the topology of the supply network. A control unit includes hardware and software to carry out the method.

14 Claims, 3 Drawing Sheets

(56) References Cited

U.S. PATENT DOCUMENTS

2017/0199229 A1* 7/2017 King .................. H02J 13/00017
2022/0075337 A1* 3/2022 Zhang ................ G01R 19/2513

OTHER PUBLICATIONS

Decision to grant by the German Patent and Trademark Office (GPTO) issued in DE 10 2022 122 617.4, to which this application claims priority, dated Jul. 24, 2023 (English-language machine translation attached).

* cited by examiner

METHOD FOR MONITORING AND DETECTING THE ELECTRICAL TOPOLOGY OF A SUPPLY NETWORK

CROSS REFERENCE TO RELATED APPLICATIONS

This application claims priority to German patent application DE 10 2022 122 617.4 filed on Sep. 6, 2022, which is hereby incorporated by reference in its entirety.

TECHNICAL FIELD

The present disclosure relates to a method for monitoring and detecting the electrical topology of a supply network according to the preamble of an independent claim and a supply network for carrying out such a method according to the preamble of a dependent claim.

BACKGROUND

Detecting operating values in or directly at the load is known in the related art. For example, DE 10 2020 121 752 A1 shows an electrical plug connector having a housing having an electrical circuit that is arranged inside the housing. The electrical circuit includes a sensor device, a control device, and a communication interface, wherein the sensor device is configured to detect an electrical operating parameter and the control device is configured to generate output data based on the electrical operating parameter and to output them by means of a communication interface. According to this publication, the electrical circuit can comprise a power supply circuit, a sensor circuit, a microprocessor, and a telecommunications module.

Even if this detection of operating values is fundamentally possible in a satisfactory manner, there is a great demand, particularly in old, mature supply networks to detect the entire topology in a simple manner.

For this purpose, EP 2 748 90 7 B1 proposes a method in which a series of synchronized current and voltage measurements are carried out at network connection points and the measured data are combined in two measurement matrices for the voltage and for the current values. In a subsequent step, it is proposed that an overdetermined system of equations be set up from the values of the measurement matrices, which determines a contribution matrix Z with the aid of known methods for the approximate solution for overdetermined systems of equations, which comprises the parameters of the power supply network. In particular, the contribution matrix Z is to be determined with the help of the Moore-Penrose pseudo-inverse I+ and/or for radial networks from the contribution matrix Z by maximum considerations, so-called leaf nodes, i.e., end network connection points, and/or the structure of the network is determined for radial networks from the contribution matrix Z by a comparison of the voltage level of network connection points.

DE 100 48 745 C1 discloses a method according to the preamble of an appended claim.

On the one hand, these above-mentioned solutions are very complex for supply networks and do not offer sufficient certainty with regard to the current and voltage topology actually present, in particular not for a supply network of industrial treatment and/or automation systems.

SUMMARY

It is an object of the present disclosure to propose an improved method for the automated detection of an electrical topology of a supply network.

This object is achieved according to the disclosure by a method according to the features of an independent claim and a control unit according to the features of a dependent claim. Advantageous examples are specified in other respective associated dependent claims.

According to this, the object is achieved by a method for detecting the electrical topology of a supply network, comprising at least one power supply unit, a control unit, at least one field bus device, and at least one measuring device, wherein the field bus device is supplied by the power supply unit as a supply source, in particular as a voltage and/or current source, the at least one measuring device is a smart connector, a field bus device, and/or an operating value sensor integrated in the power supply unit or connected thereto, and wherein at least one load is comprised, which is a field bus device and/or another powered device.

This involves going through the following steps:
a) activating at least one load to generate an operating signal,
b) receiving the operating signal and/or the time profile of the operating signal by way of at least one measuring device,
c) detecting the operating value that is/being analogous to the operating signal,
d) evaluating the detection data from the operating signal and operating value,
e) applying an algorithm to determine the topology of the supply network.

The above-mentioned operating value sensor is designed to detect at least one of the following measured values: current, voltage, impedance, magnetic field strength and/or another current-relevant and/or voltage-relevant measured value of at least one supply network participant or at least one supply network portion.

The exchange of data with a smart connector or a field bus device optionally takes place via existing data lines, in particular the industrial (data) network for activating, for example, the associated treatment system and machines. The network is in particular at least partially an Ethernet. There can also be an advantage if the protocol used is, for example, Profinet, Modbus TCP, Ethernet/IP, EtherCat, Profibus, CC-Link, IO-Link, or SPE, possibly with PoDL.

It can be advantageous here if the data exchange (communication) takes place with the aid of, for example, an existing PLC controller of the associated treatment system and/or a treatment machine. The PLC control of the associated treatment system and/or a treatment machine as a control unit thus communicates (sends, receives, and/or forwards) the commands and data required for the method for detecting the electrical topology of a supply network to the (central) control unit.

An improvement can be that the communication required for the method for detecting the electrical topology of the supply network also takes place independently of the associated treatment system and/or a treatment machine from a separate control unit, so that the communication of the associated treatment system and/or an associated treatment machine does not have to be influenced and/or changed. Thus, for example, no intervention in the program for controlling the actual production or the treatment system and/or one of the treatment machines is necessary.

Furthermore, there may be an advantage in that the communication with a smart connector or a field bus device for carrying out the method for detecting the electrical topology of the supply network takes place through one or more other separate devices that communicate with the control unit, as described above.

An improvement can exist here if the communication with a smart connector takes place through one or more other separate devices that communicate wirelessly, for example, via WiFi, radio or Bluetooth. Advantageously, these other devices communicate with the above-mentioned (central) controller. This example is particularly advantageous when there are large distances or other unfavorable spatial or structural conditions in a treatment system. Furthermore, it can be advantageous to provide several such additional devices that ensure communication with the smart connectors and/or the field devices.

A "smart connector" or a "smart connector unit" is to be understood in the present case as an electronic component which is designed as a sensor element for detecting values of the current and voltage-supplying cables and thus can detect and forward to a control unit data such as current values, voltages, temperatures, and/or other relevant operating and power data of a line. Advantageously, a smart connector includes a microprocessor with which detection data can be evaluated and processed, wherein suitable storage media can be provided as required. In one example, a smart connector can include a switching element with which the monitored line can be switched.

The exact position of the supply network components is not the primary focus of the procedure, i.e., their spatial position and dimensions relative to each other at the installation site or the length of lines (cables) are not ascertained unless they can be considered as a constant supply network property, such as a capacitance or an inductance of a line or line connection.

Even if the following measuring devices are explained in terms of properties and functions, in particular using smart connectors as measuring devices, this should not be understood in a restrictive manner and a field bus device or the power supply unit with operating value sensor should also be understood in an identical or analogous manner, unless something else is expressly stated and/or it is technically, physically unreasonable and/or impossible. For example, as a rule, multiple power supply units will not be provided, but rather a plurality of smart connectors and/or field bus devices will be supplied with one power supply unit and not vice versa. Furthermore, an existing supply network will primarily be supplemented with a plurality of economically advantageous smart connectors, and not primarily replaced with a large number of field bus devices, in order to upgrade the supply network for the method according to the disclosure.

In the present case, the "operating signal" is to be understood as an induced change of an operating parameter of a load, which is controlled in a defined manner for the purpose of detecting and determining the topology. By analogy, in the present case this "operating parameter" means the controllable parameter stored in the control unit and/or the load, which results in the detectable "operating signal". For example, the operating signal is a defined power increase and the corresponding "operating parameter" is the doubling of the rotation speed of the motor (load). By analogy, "operating value" means the respective physical or electrical variable analogous to the "operating signal", detected or detectable substantially outside the duration of the operating signal.

In the present case, "detecting" of an operating signal is always to be understood as at least temporary storage of detected data in the measuring device and/or a connected control unit.

The above-mentioned "field bus devices" can in particular be sensors, actuators, or I/O modules. Furthermore, field devices can also be understood as a human machine interface (HMI) or a programmable logic controller (PLC).

In an example, step c), detecting the operating value that is analogous to the operating signal, can take place before or after step a), in particular immediately before steps a) or b) with respect to time. In this way, the zero state or initial state of the supply network is detected. Alternatively, it can be advantageous if step c) takes place before step a) and after step b), particularly in the case of supply network portions that have many supply network participants connected in series or when carrying out the method when there are many interference variables influencing the operating signals.

It can be particularly advantageous here if, in the case that step c) takes place after step b), receiving the operating signal and/or the time profile of the operating signal by way of the at least one measuring device, the end (decay) of the operating signal is waited out, in particular the complete end (decay) of the operating parameter is waited out.

In this respect, it is advantageous to carry out step c), detecting the operating value that is analogous to the operating signal, before and after step b). Due to the previous detection of the operating value that is analogous to the operating signal, this is known in terms of level, size, or characteristics and when the same level, size, and/or characteristics of this previous operating value are reached, the detecting of the operating signal or the course of the operating signal can be regarded as completed and can be ended.

In a method variant, steps d) and e) are carried out with a time offset. In particular steps a) to c) can be carried out several times and steps d) and e) are carried out for a plurality of one of the above-mentioned sequences of steps a), b), and/or c).

"Detection data" are to be understood to mean all measured values and data which are detected by a measuring unit, for example also a smart connector, via a or by a line. Furthermore, the term "detection data" is used throughout, even if these data may be converged, digitized, compressed, or otherwise processed, starting from the measured value which was first determined. Therefore, "detection data" are also to be understood as any form or component of the processing of the data which are sent or forwarded from a measuring device within or to a smart connector. In the present case, the measuring device can be in the form of a simple current or voltage sensor which forwards the detection data to a connected control unit. Advantageously, the measuring device, for example a smart connector, comprises a microprocessor, so that the recorded data can be at least partially evaluated and stored as required, or only transmitted to the control unit to the required extent as required and possibly upon request.

In principle, the data processing of the detection data can take place somewhere in the supply network, in particular somewhere in the smart connector. In this way, an existing supply network can also be equipped and operated with its own detection function for the topology by integrating a plurality of smart connectors.

Furthermore, the control unit is not to be understood as restrictive and can be formed in several parts from two or more sub-units or can comprise at least one sub-unit which cooperate with one another in a data-conducting manner. In particular, the control unit can include an evaluation unit as a sub-unit or can be connected to an evaluation unit in which the evaluation of the detection data takes place largely independently of the actual operation and the actual control of the network, the supply network, and/or a connected treatment and/or automation system, and wherein the results of the evaluation can be made available to the controller as required.

In the present case, "operating data" means data which are exchanged between a control unit, a master to or with a device (field bus device and/or load) even in the absence and in particular without supplementary detection data.

In this context, "topology" means the arrangement and sequence of the loads, in particular of the field bus devices and the smart connectors in the power supply network, i.e., a current or voltage topology. As also shown in the figures in particular, the topology is formed or represented essentially as a graph having a power supply unit as the supply source, multiple supply network components such as field bus devices and smart connectors, lines and line nodes connecting the supply source and the supply network components.

In a treatment system or in a treatment machine, there can be multiple independent supply networks with one power supply unit or with multiple power supply units. The method for detecting the electrical topology of a supply network is also usable when the entire supply network or parts (branches) of the supply network are supplied by two or more power supply units.

In an improved method variant, it can be advantageous if, in evaluation step d), the detection data determined from the operating signal and/or operating value are structured immediately and/or subsequently, such as adding an ID and/or a time stamp, and wherein the detection data are sent after the structuring to the control unit and/or another central evaluation and/or storage unit.

In a further improved method variant, it can be advantageous if, in step b), the time profile of the operating signal received by the control unit is detected by the at least one measuring device, wherein this detection of the time profile takes place based on an occurrence of the following characteristics of the operating signal:
  a) a single, sudden increase in the operating parameter is produced as an operating signal, in particular having a short "rise-time" of the current and/or voltage; and/or
  b) a high-frequency, periodic change in the current and/or the voltage is produced as the operating signal.

In a further improved method variant, it can be advantageous if the loads, in particular all loads, of the supply network are controlled according to step a) to generate respective operating signals (operating signal) according to a defined sequence, prioritization and/or according to a random principle.

In a further improved method variant, it can be advantageous if, in step a), two or more loads are activated in such a way that they send respective operating signals into the supply network at the same time.

Advantageously, in step b), the time profile of the operating signal received by the control unit is detected by the at least one measuring device.

In a further method variant, an improvement can consist of a delimitation step being carried out at least temporarily in parallel with at least one of steps a) and/or b). This delimitation step can consist of at least one smart connector and/or another load, in particular a field bus device, sending a counter signal (reciprocal signal) into the supply network, so that it becomes distinguishable which measuring devices are before or after the load sending the operating signal and/or the load sending the counter signal.

The delimitation step is advantageously carried out at least temporarily in parallel with step b), the reception step. The counter signal is in particular a weakening and/or a blocking of the effects of an initiated operating signal in other sections of the supply network. A counter signal is not to be understood in a restrictive manner and, in addition to additional electrical or physical signals, also means other controls and actions for a load or a measuring device in order to delimit it from the load or network portion to be detected. In addition to the types of counter signals mentioned below, this can also be, for example, temporarily switching off or switching a detour (bypass line) to a load, for example, in order to temporarily exclude competing capacitances and/or inductances.

In a further improved method variant, it can be advantageous if, in the above-mentioned method variant, the delimitation step and the initiation of a counter signal takes place at least temporarily in parallel with one of steps a) and/or b), wherein the counter signal is formed and/or initiated as a function of the characteristics of the operating signal, and wherein the counter signal consists of at least one additional inductance and/or capacitance being connected in parallel and/or in series as a counter signal at least for a period of time parallel to the operating signal in at least one load, in particular a field bus device.

It has proven particularly advantageous if at least one counter signal is switched on as an additional inductance and/or capacitance, wherein this opposing signal:
  a) changes the time profile (rise/fall time) of the current/voltage change in parts of the power supply network if the operating signal consists of a single, sudden increase (short rise time) of an operating parameter; or
  b) filters out and/or blocks a high-frequency operating signal, in particular if the operating signal is a high-frequency and/or a periodic change of an electrical operating parameter.

The operating parameter here is in particular the current flow, the current intensity, the voltage, and/or the magnetic field strength.

In this way, at least part of the topology is distinguishable, in particular it is distinguishable which measuring devices are located before or after the load sending the operating signal and/or the load sending the counter signal.

In an alternative example of the method it can be provided that adding on additional inductances and/or capacitances can be omitted at least in parts of the supply network if the capacitance and/or inductance of this part of the supply network are known and are known in the controller as supply network data. Such supply network data (inductances and/or capacitances) can be determined, for example, by the producer or as laboratory data if a load or a measuring device, such as a smart connector, was manufactured and delivered in connection with a connection cable and, for example, supply network data about the smart connector and/or the connection cable are stored in the smart connector. In this way, the influences of other supply network-related inductances and/or capacitances can be mathematically differentiated from detected operating signals.

In a further improved method variant, it can be advantageous if the operating signal sent by at least one load into the supply network in step a) is the following:
  a longer current flow defined for a period of time through an idle power,
  a longer current flow defined for a period of time through an operating performance, or
  a modulation of the current consumption of a load according to a defined gradient and/or cycle.

The supply network is usually a control, regulation, and supply network for a treatment and/or automation system and usually does not initiate any actions that are necessary for the monitoring and/or operation of the connected treatment and/or automation systems and/or the supply network itself, in particular those that are immediately necessary. In contrast to this, "idle power" means an action that is largely or completely irrelevant to the intended operation of the supply network and/or the connected treatment and/or automation system. Such idle power can consist, for example, of lighting being switched on with a defined cycle or for a defined period of time, for example all LEDs or individual LEDs of a field bus device cause an additional load on a processor with calculation-intensive operations.

In the present context, "operating performance" is to be understood to mean that one of the operating parameters of an active load is raised, stopped, and/or lowered in a defined manner in one of steps a) to b) for a defined period of time. This also includes the use of a known current signature for a defined period of time by a load, in particular a field bus device such as a sensor or actuator. The activation takes place in particular on the basis of the activation by a controller (PLC). Such a signature could consist, for example, of every 10 seconds a motor being switched on for 3 seconds or its speed being accelerated or slowed down by a defined value for 3 seconds each.

An operational signal, which is a change in an operational line, will necessarily only occur within an allowable time span, size, and/or frequency defined by the PLC/controller.

In general, it is advantageous if idle power or operating power takes place as a modulation over a defined period of time, such as a rather slow modulation, like a kind of Morse signal, by a pattern of switching on and off. Alternatively, a defined rise time of the operating signal can be initiated, usually a very short rise time, wherein the gradient is known or is specified by the controller. Additionally or alternatively, a high-frequency operating signal can be initiated, so that blocking or weakening by additional or known inductances and other electronic components or circuits is possible.

These modulations can be differentiated particularly well from the other operating parameters of the supply network and are therefore quickly determinable with regard to the load who sent the operating signal and its position relative to the detecting measuring device.

In an improved example, it can be provided that a switching element is provided in the smart connector for modulation and/or switching, via which the modulation and/or switching of at least one network portion can take place. An additional security functionality can also be achieved in this way. In particular, passive loads that are connected behind the smart connector can be switched on/off in this way.

In a further improved method variant, it can be advantageous if, between steps a) to c), in at least the portion or the branch of the supply network in which the at least one load sending the operating signal and/or the measuring device detecting the operating signal are integrated:
  no change in the other current consumption happens/takes place, or
  the amount of the change in the other current consumption in terms of amount and/or frequency is significantly smaller or larger than the amount and/or frequency of the operating signal.

It is usually not necessary for the topology to be constantly detected and newly stored during normal operation of a supply network or an associated treatment and/or automation system.

It is therefore advantageous if the detection takes place with the least possible interference and potential sources of error. It therefore makes sense to carry out the detection during rest or break times of the supply network, such as at night or outside of normal operating times of the supply network or the associated treatment and/or automation system.

Ideally, the control unit obtains the required data from the PLC of the treatment and/or automation system and selects a time frame for carrying out the detection according to method steps a) to c), in particular in step b) to c), at which no change in the current flow is to be expected due to the activation of the load, especially the field bus device, by the PLC.

In a further improved method variant, it can be advantageous if, between steps a) to c), in at least the section or branch of the supply network in which the at least one load sending the operating signal and/or the measuring device detecting the operating signal are integrated, a change in the other power consumption relevant for the operating signal occurs, wherein steps a) to c) are repeated multiple times for the same load and/or measuring device and the relevant change in the other power consumption is identifiable and filterable via statistical methods.

In a further improved method variant, it can be advantageous if, in steps d) the evaluation of the detection data and/or e) the application of an algorithm for determining the topology of the supply network, secondary data are evaluated by the control unit in addition to the detection data, wherein the secondary data relate to at least one of the following data, for example:
  Information on the topology of at least one branch or section of the supply network,
  Information on at least one load, in particular at least one unidentified or ambiguously identified branch or portion of the supply network and/or an unidentified or ambiguously identified load.

Overall, it is advantageous here if the operating values associated with the operating signal are regularly at least partially, in particular completely, measured, evaluated, and stored outside of a detection of an operating signal during steps a) to c). It can also be advantageous if secondary data are at least partially, in particular completely, measured, evaluated, and stored in at least one supply network portion in parallel or outside of a detection of an operating signal during steps a) to c).

In particular, it is advantageous if the control unit and/or a separate evaluation unit is provided, which is designed to evaluate the operating values, the operating parameters, and/or the secondary data and includes and/or uses at least one corresponding piece of software that is based on processes of machine learning (ML), a fuzzy network, and/or artificial intelligence (AI). Advantageously, further operating values and/or other measured values/data are evaluated together with the detected operating signals.

In a further improved method variant, it can be advantageous if at least one smart connector is designed as a measuring device and is arranged in the supply network between the power supply unit and the at least one load in order to detect the operating signal of the load, in particular of the field bus device, in particular the operating signal of at least one field bus device that is not designed as a measuring device.

In other words, at least one pair is formed from a smart connector with a load, wherein the smart connector is arranged immediately adjacent to and in front of the associated load.

In the present case, "before" or "after" means the direction of view from the power supply unit into the supply network and in particular towards an individual load along a line, which is usually identical to the current direction.

The disclosure also comprises a supply network for operating a treatment and/or automation system, wherein the supply network is designed and comprises corresponding components, hardware, and software components to carry out the method according to one of the previous variants and examples.

Overall, it is advantageous if at least some, but in particular all detected and/or evaluated data and/or values are provided directly or indirectly in a suitable manner, possibly after storage. This can consist of a need-based query by a user or an automated, other use. In particular, the provision can be made in a prepared graphic or tabular form, which can if needed comprise notes and comments on special features and abnormalities, such as ambiguities of a branch, a portion, and/or a load.

In particular, the supply network comprises at least one pair of a smart connector and a load, primarily a plurality of pairs of a smart connector and a respective load, wherein the loads are advantageously at least partially embodied as field bus devices.

The supply network advantageously comprises at least one power supply unit, a control unit, at least one field bus device, and at least one measuring device, wherein the field bus device is supplied by the power supply unit as a supply source, in particular as a voltage and/or current source. Furthermore, the at least one measuring device is a smart connector, a field bus device, and/or an operating value sensor that is integrated in the power supply unit or is connected thereto. The supply network also comprises at least one load, which is a field bus device and/or another device that is loaded/supplied with electrical energy.

All aspects, advantages, and options mentioned for the method are to apply identically or in an analogous manner to the supply network.

Even if the exact position of the supply network components is not the focus of the method, a determined topology can be linked and enriched with such information on the dimension or position that is jointly evaluated in the control unit and/or a separate evaluation unit. This is, in particular, information about the design and functionality of individual smart connectors, information about loads, such as field bus devices, for example location, task, intended use, type of activation by a controller (PLC), and/or the specific cable length of the supplying line to the power supply unit, the adjacent measuring device, in particular smart connectors and/or another connected supply network participant.

BRIEF DESCRIPTION OF THE DRAWINGS

Further details and advantages of the disclosure will now be explained in more detail using the exemplary embodiments illustrated in the drawings.

In the drawings.

DESCRIPTION OF EXEMPLARY EMBODIMENTS

Figure 1:
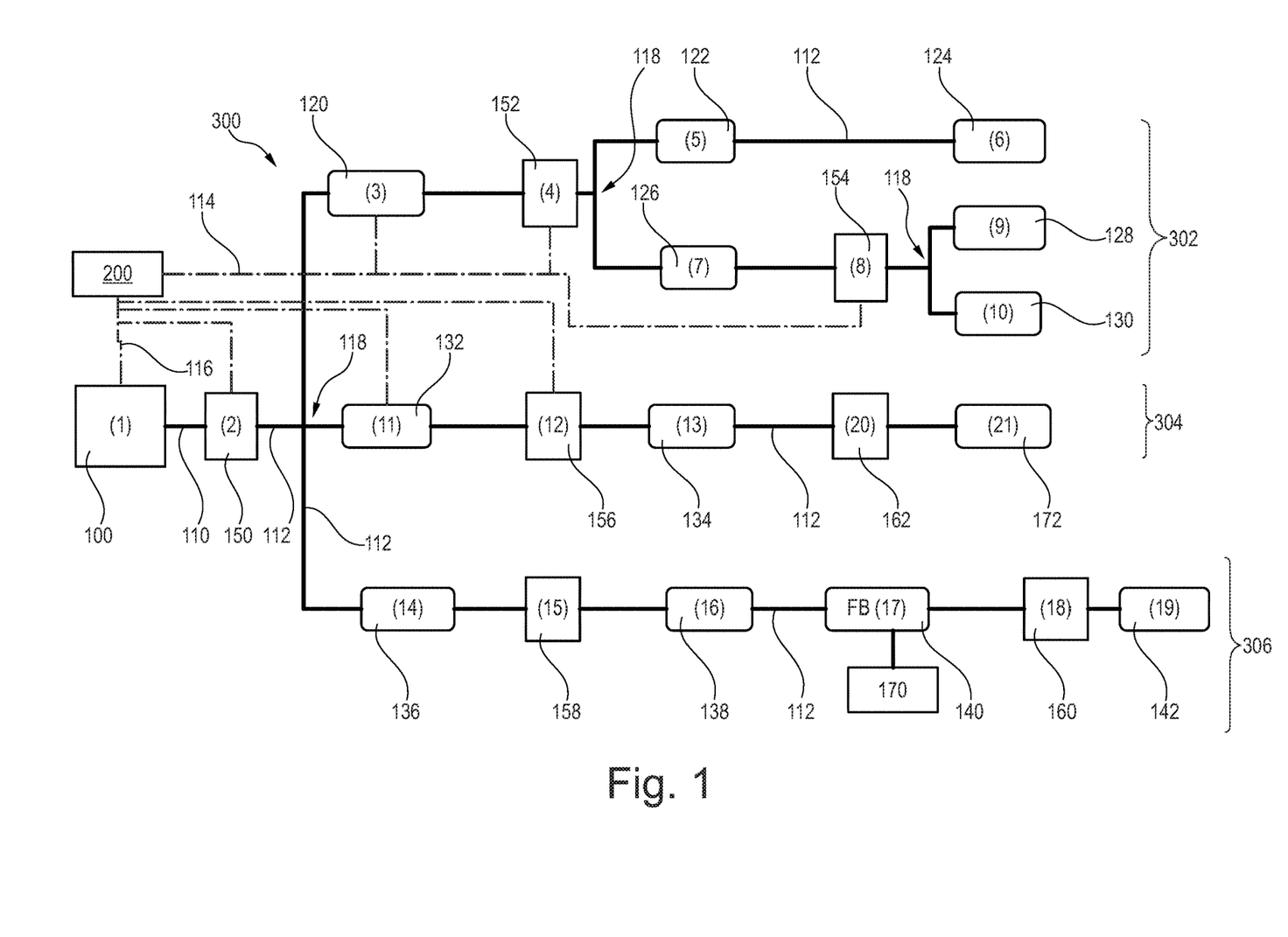
FIG. 1 shows a schematic representation of an example supply network.

FIG. 1 shows the topology of a supply network 300 in a very simplified manner. The supply network 300 comprises a power supply unit 100 and a total of three network portions 302, 304, 306, each having a different number and type of network participants. In FIG. 1, these network participants are several smart connectors 150 . . . 162, several field bus devices 120 . . . 142, a device 170 designed as a rotating motor, and a passive load 172. The three network portions 302, 304, 306 are parallel to one another and are connected via a line node 118, which is arranged after the first smart connector 150. The network participants of a network portion 302, 304, 306 are connected via lines 112 to the respectively adjacent network participant.

The first line section has two further line nodes 118. At the first line node 118, the first network portion 302 is divided into two subsections having two or more network participants, and at the second line node 118 of the first network portion 302, two field bus devices 128, 130 are connected in parallel.

The second network portion 304 has no further line node and is connected to the first smart connector 150 via the central line node 118 and via this to the power supply unit 100. A passive load 172 with the smart connector 162 arranged in front of it is arranged at the end of the second network portion 304.

The third network portion 306 also has several network participants, but no line nodes, wherein it is shown by way of example that a device 170 designed as a motor and presenting its own electrical load is connected to a field bus device 140 in a central position in the third network portion 306 and is switched and supplied thereby.

Furthermore, the supply network 300 comprises a control unit 200 and/or is connected thereto at least in a data-conducting manner. The control unit 200 is connected to the network subscribers to be controlled via data lines 114 shown in dot-dash lines, wherein not all data lines 114 are shown for reasons of clarity. The control unit 200 is additionally connected to the power supply unit 100 via the data line 116. For the sake of simplicity, the control unit 200 and data lines 114, 116 are discussed here, wherein this is not to be understood as restrictive and is also to comprise any type of control, regulation, and data lines, including those with a partial current and/or voltage supply. This includes in particular any data or field bus systems and/or point-to-point systems that comprise two or more line cores. In particular, these are also the standardized systems such as CAN bus, Profibus, Hart bus, IO-Link, SPE, SPE with PoDL, or even proprietary systems.

Figure 3:
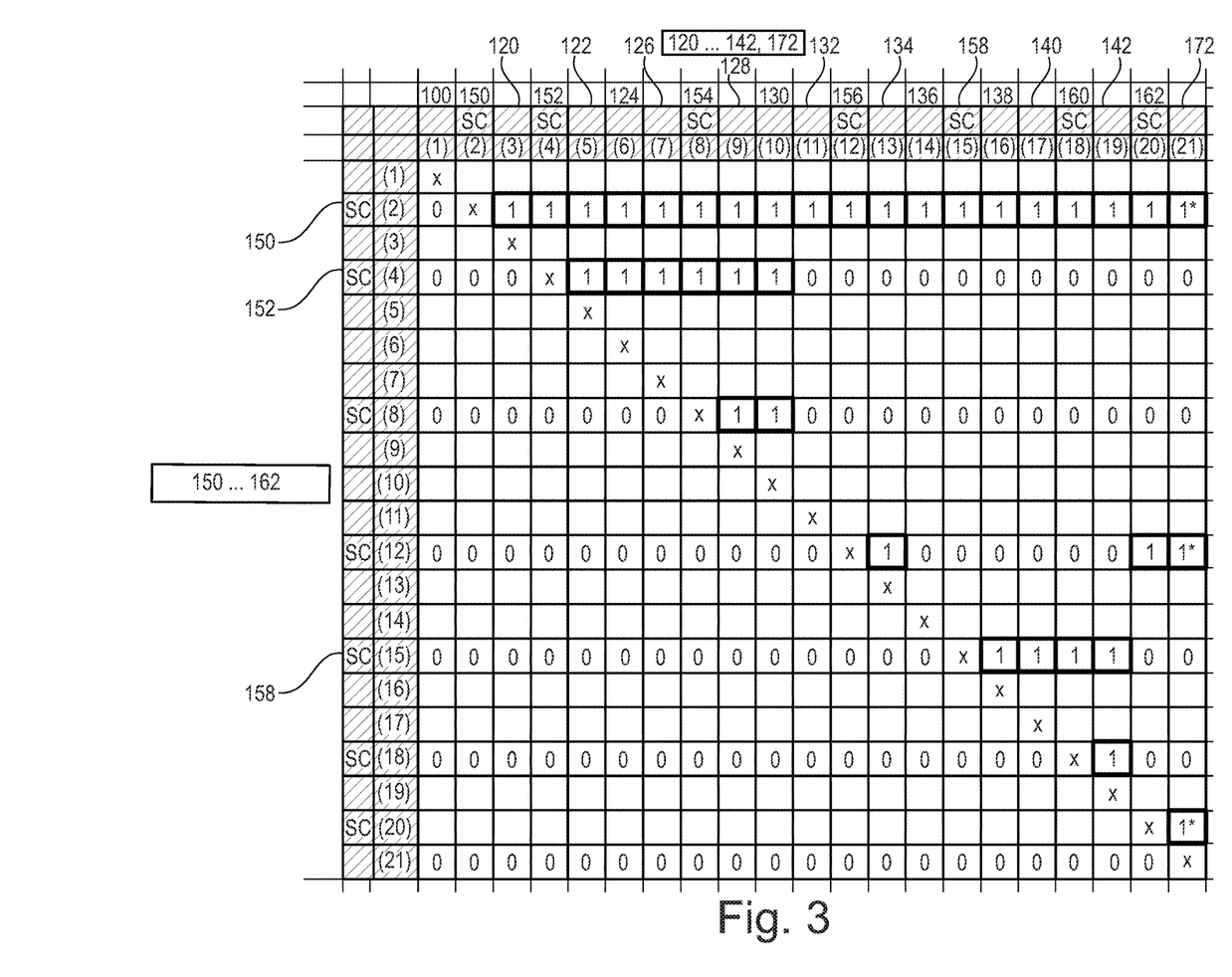
FIG. 3 shows an evaluation matrix for the example supply network in a first iteration step.

The numbers 1 to 21 placed between parentheses refer to the evaluation matrix of FIG. 3 and assign a serial number increasing by 1 to all network participants.

Figure 2:
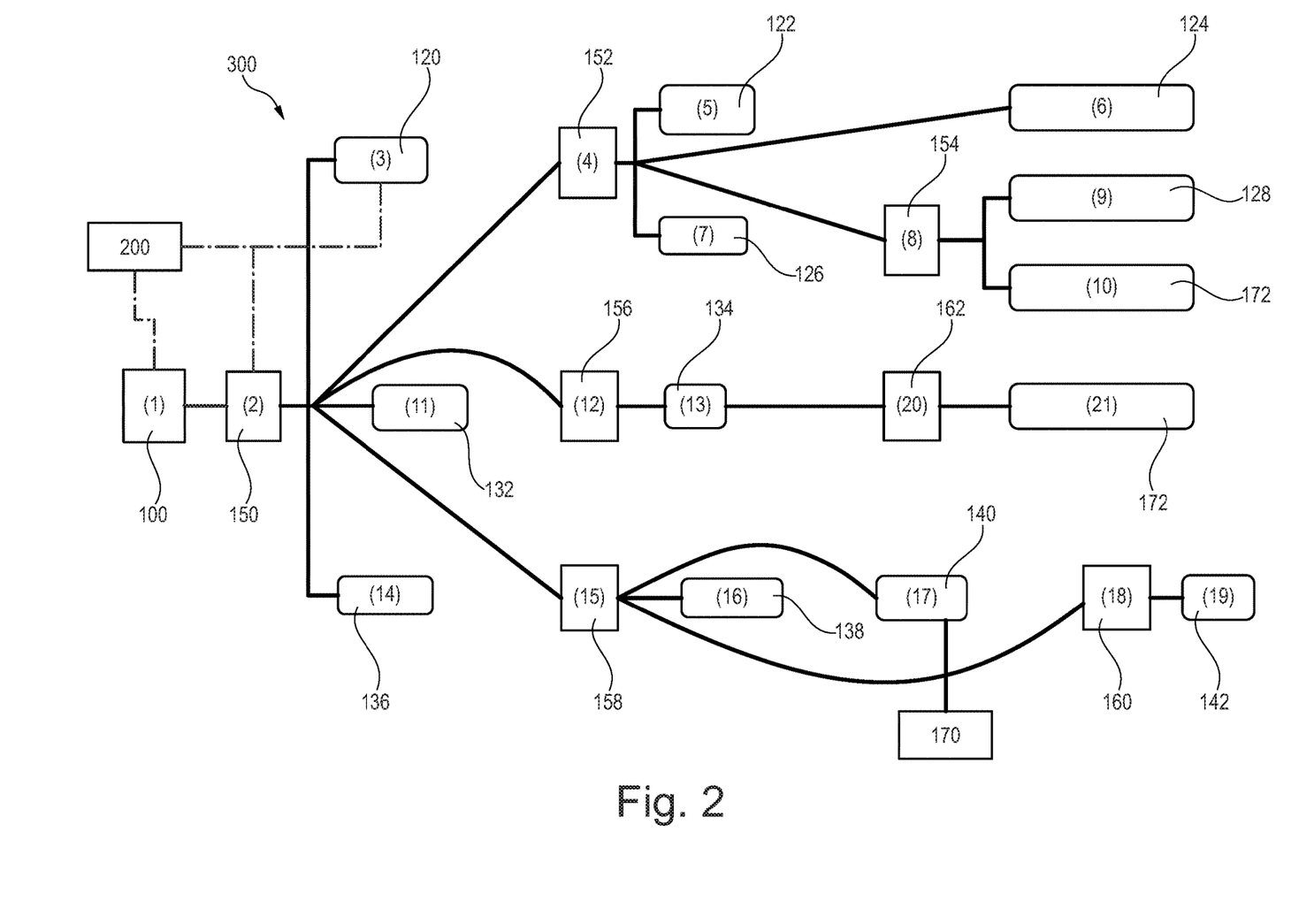
FIG. 2 shows a schematic representation of the example supply network in an iteration step when determining the topology.

The supply network 300 shown in FIG. 2 shows the supply network 300 in the first iteration step. This is the moment when an operating signal has been sent in advance from each field bus device 120 . . . 142 and/or the passive load 172 and the associated detection data has been received by the control unit 200 and evaluated. For simplification, it is assumed here that only the smart connectors 150 . . . 162 are designed as measuring devices and that they alone can receive operating signals, and wherein all field bus devices 120 . . . 142 and the load 172 or the device 170 can generate operating signals in the supply network 300.

Evaluating the received operating signals from this first step results in the following:

Smart connector 150 (also denoted by (2)) receives all operating signals from all three network portions 302, 304, 306 of all loads.

The smart connector 152 (also denoted by (4)) receives from the first network portion 302 the operating signals of all loads except for the field bus device 120 (also denoted by (3)).

Analogously, the first smart connector 156 (also denoted by (12)) receives all operating signals from all loads of the second network portion 304, except for an operating signal from the front field bus device 132 (also denoted by (11)) and the first smart connector 158 (also denoted by (15)) of the third network portion 306 receives all operating signals of all loads, except for an operating signal of the front field bus device 136 (also denoted by (14)).

In an analogous manner, the other smart connectors, such as the rear smart connector 160 (also denoted by (18)), only receive an operating signal that can be received by the field bus device 142 (also denoted by (19)).

FIG. 3 shows a reconstruction matrix as it resulted after the above-mentioned initiation of an operating signal from each load, in particular the field bus devices 120 . . . 142, wherein the device 170 was not entered separately and took place via the detection of the field bus device 140 (also denoted by 17).

The loads generating an operating signal are listed in the first two rows and the smart connectors receiving an operating signal are listed in the first two columns. The same numerical values and reference symbols apply as stated above.

Thus, the smart connector 150 denoted by (2) in the second row detects all operating signals of the network participants (3) to (21), the smart connector 152 denoted by (4) detects the operating signals of the network participants (5) to (10), and the smart connector 158 denoted by (15) detects all network participants 16 to 19.

In this first iteration step, for example, it cannot be distinguished whether the two field bus devices 122 (5), 124 (6) are connected in series or in parallel to the smart connector 152 (4); the same applies, for example, in an analogous manner to the connection of the two field bus devices 138 (16) and 140 (17) to the smart connector 158 (15). Likewise, in the first iteration stage it is not yet recognizable how or whether the smart connector 158 (15) is connected to the field bus device 136 (14).

From this, a first algorithm for reconstruction can be derived as follows, wherein network participants were abbreviated as NT:

1. Copy the measured value table according to FIG. 3 into a next reconstruction matrix.
   1.1 Iterate over all NTs in the matrix.
      1.1.1 Designate the current NT of the iteration as "A". (Example: A=4).
      1.1.2 Iterate over all NTs that are "behind" NT "A", i.e., that are linked to NT "A" via a "1" in the reconstruction matrix.
         1.1.2.1 Designate the current NT of the iteration as "B"(example: B=8).
         1.1.2.2 Iterate over all NTs that are "behind" NT "A", i.e., that are linked to NT "B" via a "1" in the reconstruction matrix.
            1.1.2.2.1 Designate the current NT of the iteration as "C"(example: C=9).
            1.1.2.2.2 Check whether the reconstruction matrix "C" is connected to "A", i.e., whether NT "C" is linked to the NT "A" via a "1" in the reconstruction matrix.
               1.1.2.2.2.1 If yes, delete the connection between "C" and "A" in the reconstruction matrix (Example: Delete connection between 4 and 9).
   1.2 Draw a graph using the information from the reconstruction table.

In the example shown, the field bus devices 134 (13) and the field bus device 142 (19) can be clearly identified as network participants, since they are the only network participants behind each smart connector.

A further reconstruction can be carried out by means of a parallel initiation of operating signals from two field bus devices and/or a delimitation step, as described above, in order to determine further details of the topology.

LIST OF REFERENCE NUMERALS 100 power supply unit
110 line
112 line
114 data line
116 data line
118 line node
120 field bus device
122 field bus device
124 field bus device
126 field bus device
128 field bus device
130 field bus device
132 field bus device
134 field bus device
136 field bus device
138 field bus device
140 field bus device
142 field bus device
150 smart connector
152 smart connector
154 smart connector
156 smart connector
158 smart connector
160 smart connector
162 smart connector
170 device
172 load, passive
200 control unit
300 network
302 network portion
304 network portion
306 network portion

The invention claimed is:

1. A method for detecting, by a control unit, an electrical topology of a supply network, the supply network comprising:
   at least one power supply unit;
   the control unit;
   at least one field bus device; and
   at least one measuring device, wherein
   the at least one field bus device is supplied by the power supply unit as a supply source; wherein
   the at least one measuring device is a smart connector, a field bus device, and/or an operating value sensor integrated in or connected to the power supply unit, and wherein
   the supply network comprises at least one electrical load, wherein the electrical load is one of the at least one field bus device and/or a device presenting its own electrical load, the method comprising:
   a) activating, by the control unit, at least one electrical load to generate an operating signal;

b) receiving, by the control unit, the operating signal and/or a time profile of the operating signal by way of the at least one measuring device;
c) detecting, by the control unit, an operating value that is analogous to the operating signal;
d) evaluating, by the control unit, detection data from the operating signal and the operating value; and
e) applying, by the control unit, an algorithm to determine the electrical topology of the supply network.

2. The method according to claim 1, wherein, in the evaluation step d) immediately and/or subsequently following detection of the detection data determined from the operating signal and/or the operating value, these detection data are structured, such as by an addition of an ID and/or a time stamp, and wherein the detection data are sent after the structuring to the control unit and/or another central evaluation and/or storage unit.

3. The method according to claim 1, wherein, in the step b) a time profile of the operating signal is received by the control unit from the at least one measuring device, wherein this takes place based on an occurrence of following characteristics of the operating signals:
 a) a single, sudden increase in an operating parameter takes place as the operating signal, and/or
 b) a high-frequency, periodic change in a current and/or a voltage takes place as the operating signal.

4. The method according to claim 1, wherein, according to a defined sequence, prioritization, and/or according to a random principle, the electrical loads of the supply network are activated according to step a) to generate respective operating signals.

5. The method according to claim 1, wherein, in step a) two or more electrical loads are activated in such a way that each of the two or more electrical loads sends a respective operating signal into the supply network at a same time.

6. The method according to claim 1, wherein a delimitation step takes place at least temporarily for at least one of the steps a) and/or b), wherein a counter signal is sent from at least one smart connector and/or other electrical load into the supply network, so that it becomes distinguishable which measuring devices are located before or after the electrical load sending the operating signal and/or the counter signal.

7. The method according to claim 6, wherein, in step b), wherein the counter signal takes place as a function of characteristics of the operating signal and comprises at least one additional inductance and/or capacitance being added in parallel and/or in series at least for a period of time in parallel to the operating signal in at least one further load as the counter signal.

8. The method according to claim 1, wherein the operating signal sent in step a) by at least one load into the supply network is at least one of:
 a longer current flow defined for a period of time through an idle power;
 a longer current flow defined for a period of time through an operating power; or
 a modulation of a current consumption of a load according to a defined gradient and/or cycle.

9. The method according to claim 1, wherein between steps a) to c) in at least a portion or a branch of the supply network in which the at least one load sending the operating signal and/or the measuring device detecting the operating signal are integrated:
 no change in other power consumption takes place, or
 an amount of the change in the other power consumption is significantly smaller or larger in terms of amount and/or frequency than the amount and/or frequency of the operating signal.

10. The method according to claim 9, wherein, between steps a) to c), in at least the portion or the branch of the supply network in which the at least one load sending the operating signal and/or the measuring device detecting the operating signal are integrated, a change in the other power consumption relevant for the operating signal occurs, wherein steps a) to c) are repeated multiple times for a same load and the change in the other power consumption relevant for the operating signal is identifiable and filterable via statistical methods.

11. The method according to claim 1, wherein, in steps d) of the evaluation of the detection data and/or
e) of the application of an algorithm to determine the topology of the supply network, secondary data are evaluated by the control unit in addition to the detection data.

12. The method according to claim 1, wherein at least one smart connector is designed as a measuring device and is arranged in the supply network between the power supply unit and the at least one load in order to detect the operating signal of the load, in particular of the field bus device.

13. The method according to claim 1, wherein the step c), detecting the operating value that is analogous to the operating signal, takes place time wise in accordance with one of three following alternatives:
 before the steps a) and/or b),
 after the step b), or
 before one of the steps a) or b) and after step b),
wherein step c) can be carried out multiple times according to at least one of the three alternatives or different ones of the three alternatives.

14. A control unit for detecting a topology of a supply network, wherein the supply network comprises:
 at least one power supply unit;
 at least one field bus device; and
 at least one measuring device, wherein
 the at least one field bus device is configured to be supplied by the power supply unit as a supply source; wherein
 the at least one measuring device is a smart connector, a field bus device, and/or an operating value sensor integrated in or connected to the power supply unit,
 the supply network comprises at least one electrical load, wherein the electrical load is one of the at least one field bus device and/or a device presenting its own electrical load, and wherein
 the control unit includes hardware and software components to;
 a) activate at least one electrical load to generate an operating signal;
 b) receive the operating signal and/or a time profile of the operating signal by way of the at least one measuring device;
 c) detect an operating value that is analogous to the operating signal;
 d) evaluate detection data from the operating signal and the operating value; and
 e) apply an algorithm to determine the electrical topology of the supply network.

\* \* \* \* \*